(12) United States Patent
Wang (10) Patent No.: US 11,873,912 B1
(45) Date of Patent: Jan. 16, 2024

(54) VACUUM BREAKER VALVE

(71) Applicant: Hsiang-Shih Wang, Changhua (TW)

(72) Inventor: Hsiang-Shih Wang, Changhua (TW)

( * ) Notice: Subject to any disclaimer, the term of this patent is extended or adjusted under 35 U.S.C. 154(b) by 0 days.

(21) Appl. No.: 17/959,172

(22) Filed: Oct. 3, 2022

(51) Int. Cl.
*F16K 15/06* (2006.01)
*E03C 1/10* (2006.01)

(52) U.S. Cl.
CPC .............. *F16K 15/063* (2013.01); *E03C 1/10* (2013.01)

(58) Field of Classification Search
CPC ................................. F16K 15/063; E03C 1/10
See application file for complete search history.

(56) References Cited

U.S. PATENT DOCUMENTS

| | | | | |
|---|---|---|---|---|
| 4,669,497 A * | 6/1987 | Tenhengel | ............... | E03C 1/104 137/218 |
| 4,712,575 A * | 12/1987 | Lair | ......... | E03C 1/104 137/218 |
| 5,228,471 A * | 7/1993 | Hoeptner, III | .......... | E03B 9/025 137/218 |
| 5,372,158 A * | 12/1994 | Berfield | ................... | E03C 1/102 251/312 |
| 7,458,388 B2 * | 12/2008 | Huang | ...................... | E03B 7/10 137/859 |
| 8,042,565 B2 * | 10/2011 | Ball | ...................... | F16K 15/066 137/218 |
| 8,245,721 B2 * | 8/2012 | Kuo | ........................ | E03C 1/104 137/217 |
| 9,228,666 B2 * | 1/2016 | Ball | ........................ | E03C 1/106 |
| 9,719,606 B1 * | 8/2017 | Yang | ...................... | F16K 15/063 |
| 9,982,792 B2 * | 5/2018 | Kuo | ........................ | E03C 1/104 |
| 10,378,667 B2 * | 8/2019 | Huang | ................ | F16K 31/1262 |
| 10,889,967 B2 * | 1/2021 | Lei | ........................... | F16K 15/03 |
| 11,746,510 B2 * | 9/2023 | Neilson | ..................... | E03B 9/14 137/15.02 |

\* cited by examiner

*Primary Examiner* — Kevin R Barss
(74) *Attorney, Agent, or Firm* — Che-Yang Chen; Law Office of Michael Chen (57) ABSTRACT

A vacuum breaker valve may include a valve body, a non-return member, a waterstop, and an abutting member. The valve body has a water inlet end and a water outlet end, and the valve body is connected to a pipe so as the water flows from the water inlet end to the water outlet end. The valve body has a shoulder portion and a stepped portion on the inner wall thereof, and the top surface of the shoulder portion comprises at least a first through hole downwardly penetrating the outer wall of the valve body. The shoulder portion is located below the stepped portion, and the stepped portion is formed in two steps shape, which has a vertical first abutting edge, a horizontal second abutting edge, and a vertical third abutting edge in sequence.

8 Claims, 12 Drawing Sheets

VACUUM BREAKER VALVE

FIELD OF THE INVENTION

The present invention relates to a water valve and more particularly to a vacuum breaker valve with the functions of vacuum break and non-return.

BACKGROUND OF THE INVENTION

The vacuum breaker valve is installed in the water pipe or water equipment, so that the vacuum breaker valve can be automatically opened when the water source is connected and can reversely backstop when the water source is cut off so as to eliminate the vacuum phenomenon in the pipe and protect the pipe from damage due to high water pressure, negative pressure, or vacuum.

However, the conventional vacuum breaker valve has following disadvantages: the leakproof effect is simply completed by O-ring which has only small contact area with the pipe, but also O-ring cannot be sufficient against the wall of vacuum breaker valve, that lowers the leakproof effect of the vacuum breaker valve. Therefore, there remains a need for a new and improved design for a vacuum breaker valve to overcome the problems presented above.

SUMMARY OF THE INVENTION

The present invention provides a vacuum breaker valve comprising a valve body, a non-return member, a waterstop, and an abutting member. The valve body has a water inlet end and a water outlet end, and the valve body is connected to a pipe so as the water flows from the water inlet end to the water outlet end. The valve body has a shoulder portion and a stepped portion on the inner wall thereof, and the top surface of the shoulder portion comprises at least a first through hole downwardly penetrating the outer wall of the valve body. The shoulder portion is located below the stepped portion, and the stepped portion is formed in two steps shape, which has a vertical first abutting edge, a horizontal second abutting edge, and a vertical third abutting edge in sequence. The non-return member comprises a spring and a blocking member which are positioned in the valve body, and the spring is abutted between the valve body and the blocking member. The waterstop is formed in a round cap shape having an opening faced up, and the waterstop has a peripheral edge and a bottom edge which are connected together. A locating groove is formed on the inner wall of the peripheral edge, and an elastic protrude is configured to downwardly protrude from a center portion of the bottom edge, and at least a second through hole penetrates through the elastic protrude. When the waterstop is positioned into the valve body, the first abutting edge, the second abutting edge, and the third abutting edge respectively abut against and provide support for the peripheral edge, the bottom edge, and elastic protrude. The spring is adapted to push the blocking member to bear against the elastic protrude, so that the blocking member blocks the second through hole under normal condition where water is not used. The abutting member is a hard round plate, and at least a third through hole thereon, and the abutting member is coupled in the locating groove of the waterstop. With the outward push of the abutting member, the waterstop is configured to effectively fit with the first abutting edge, the second abutting edge, and the third abutting edge, and the waterstop is clamped by the abutting member, such that the first abutting edge, the second abutting edge, and the third abutting edge are adapted to respectively provide supports for the peripheral edge, the bottom edge, and the elastic protrude, so as to increase the contact area between the waterstop and the valve body, thereby achieving the leakage-proof of the waterstop.

Comparing with conventional vacuum breaker valve, the present invention is advantageous because: (i) the valve body has the first abutting edge, the second abutting edge, and the third abutting edge which respectively abut against and provide support for the peripheral edge, the bottom edge, and the elastic protrude, so as to increase the contact area between the waterstop and the valve body, thereby achieving improved leakage-proof of the waterstop; and (ii) the abutting member is a hard round plate, and when the abutting member is coupled in the locating groove of waterstop, the peripheral edge, the bottom edge, and the elastic protrude are respectively abutted against the first abutting edge, the second abutting edge, and the third abutting edge, so as to prevent leakage.

BRIEF DESCRIPTION OF THE DRAWINGS

FIG.6 is a schematic view of the vacuum breaker valve of the present invention when water is turned on.

FIG. 7 is a partial enlarged view of the vacuum breaker valve of the present invention when water is turned on.

FIG. 11 is a schematic view of the second embodiment of the vacuum breaker valve of the present invention when water is turned on.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a vacuum breaker valve (1) comprising a valve body (10), a non-return member (20), a waterstop (30), and an abutting member (40). The valve body (10) has a water inlet end (11) and a water outlet end (12), and the valve body (10) is connected to a pipe (50) so as the water flows from the water inlet end (11) to the water outlet end (12). The valve body (10) has a shoulder portion (13) and a stepped portion (14) on the inner wall thereof, and the top surface of the shoulder portion (13) comprises at least a first through hole (131) downwardly penetrating the outer wall of the valve body (10). The shoulder portion (13) is located below the stepped portion (14), and the stepped portion (14) is formed in two steps shape, which has a vertical first abutting edge (141), a horizontal second abutting edge (142), and a vertical third abutting edge (143) in sequence. The non-return member (20) comprises a spring (21) and a blocking member (22) which are positioned in the valve body (10), and the spring (21) is abutted between the valve body (10) and the blocking member (22). The waterstop (30) is formed in a round cap shape having an opening faced up, and the waterstop (30) has a peripheral edge (31) and a bottom edge (32) which are connected together. Moreover, a locating groove (33) is formed on the inner wall of the peripheral edge (31), and an elastic protrude (34) is configured to downwardly protrude from a center portion of the bottom edge (32), and at least a second through hole (341) penetrates through the elastic protrude (34). When the waterstop (30) is positioned into the valve body (10), the first abutting edge (141), the second abutting edge (142), and the third abutting edge (143) respectively abut against and provide support for the peripheral edge (31), the bottom edge (32), and the elastic protrude (34). The spring (21) is adapted to push the blocking member (22) to bear against the elastic protrude (34), so that the blocking member (22) blocks the second through hole (341) under normal condition where water is not used. The abutting member (40) is a hard round plate, and at least a third through hole (41) thereon, and the abutting member (40) is coupled in the locating groove (33) of the waterstop (30). With the outward push of the abutting member (40), the waterstop (30) is configured to effectively fit with the first abutting edge (141), the second abutting edge (142), and the third abutting edge (143), and the waterstop (30) is clamped by the abutting member (40), such that the first abutting edge (141), the second abutting edge (142), and the third abutting edge (143) are adapted to respectively provide supports for the peripheral edge (31), the bottom edge (32), and the elastic protrude (34), so as to increase the contact area between the waterstop (30) and the valve body (10), thereby achieving the leakage-proof of the waterstop (30).

In one embodiment, the valve body (10) comprises a screw hole to receive a screw (15) so as to secure the valve body (10) on the pipe (50).

In another embodiment, the screw (15) is a lock screw (151).

Figure 11:
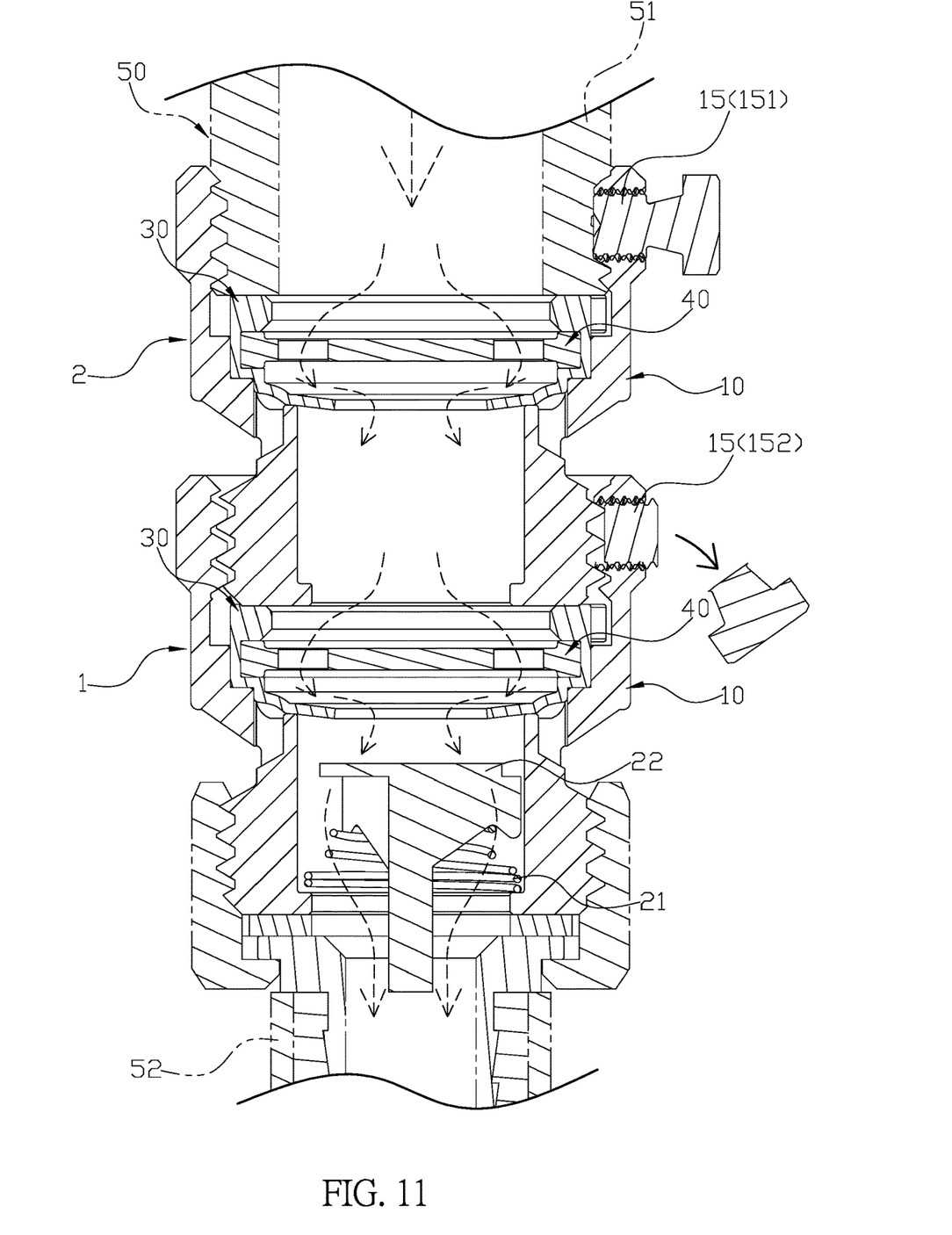

In still another embodiment, the screw (15) is a twist-off screw (152), and the part of the twist-off screw (152) exposed out of the screw hole is configured to be twisted off after the twist-off screw (152) is locked (as shown in FIG. 11).

In a further embodiment, the water inlet end (11) and the water outlet end (12) respectively have screw sections thereon to connect with the pipe (50).

In still a further embodiment, the waterstop (30) is made of rubber.

In an advantageous embodiment, the thickness of the bottom edge (32) and the thickness of the elastic protrude (34) are respectively thinner than the thickness of the peripheral edge (31).

In a preferred embodiment, the pipe (50) has a water source (51) (such as faucet) and a water equipment (52), and the vacuum breaker valve (1) is directly connected between the water source (51) and the water equipment (52) (as shown in FIGS. 6 to 9).

Figure 10:
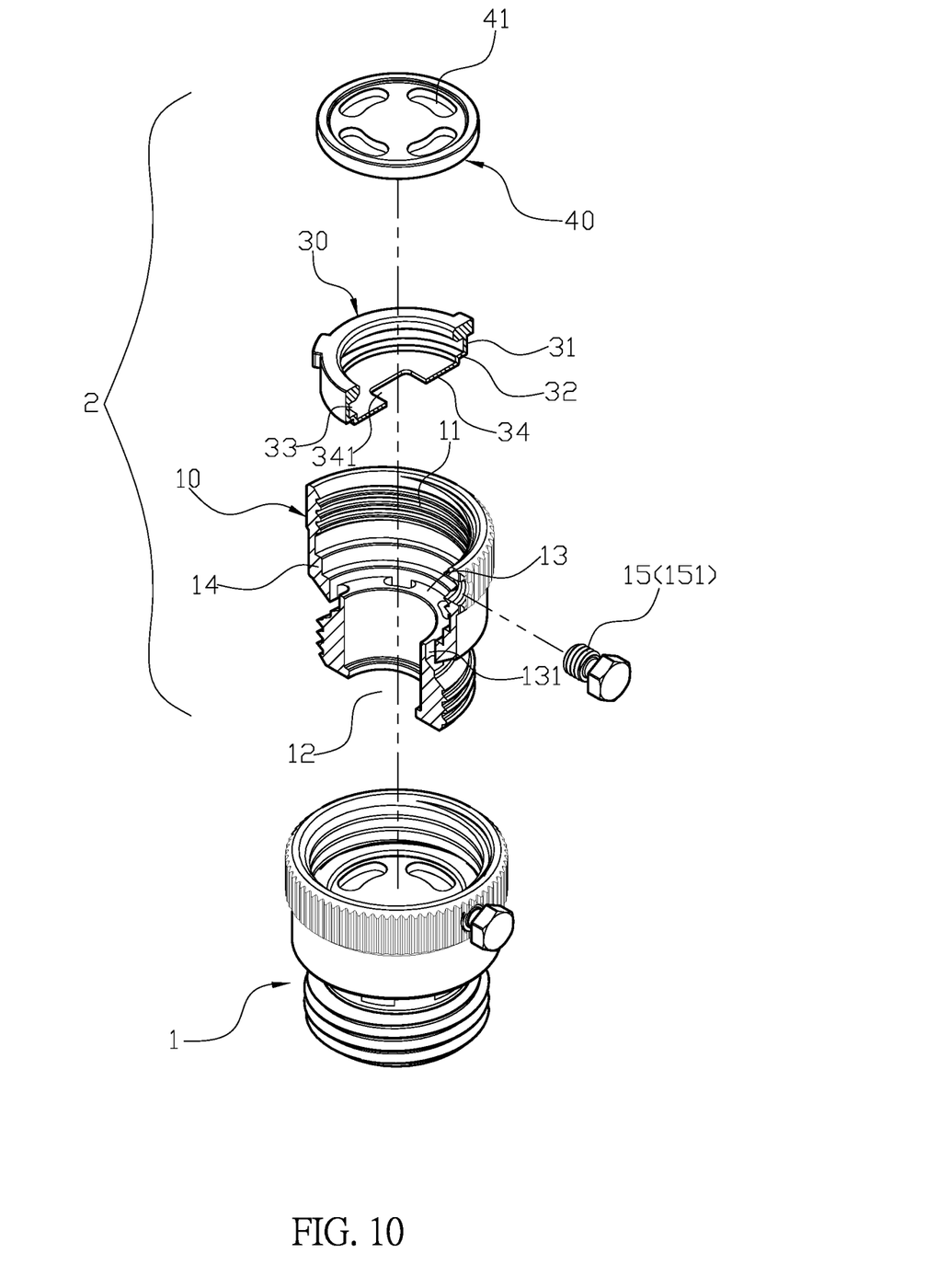
FIG. 10 is a three-dimensional exploded view of a second embodiment of the vacuum breaker valve of the present invention.
Figure 12:
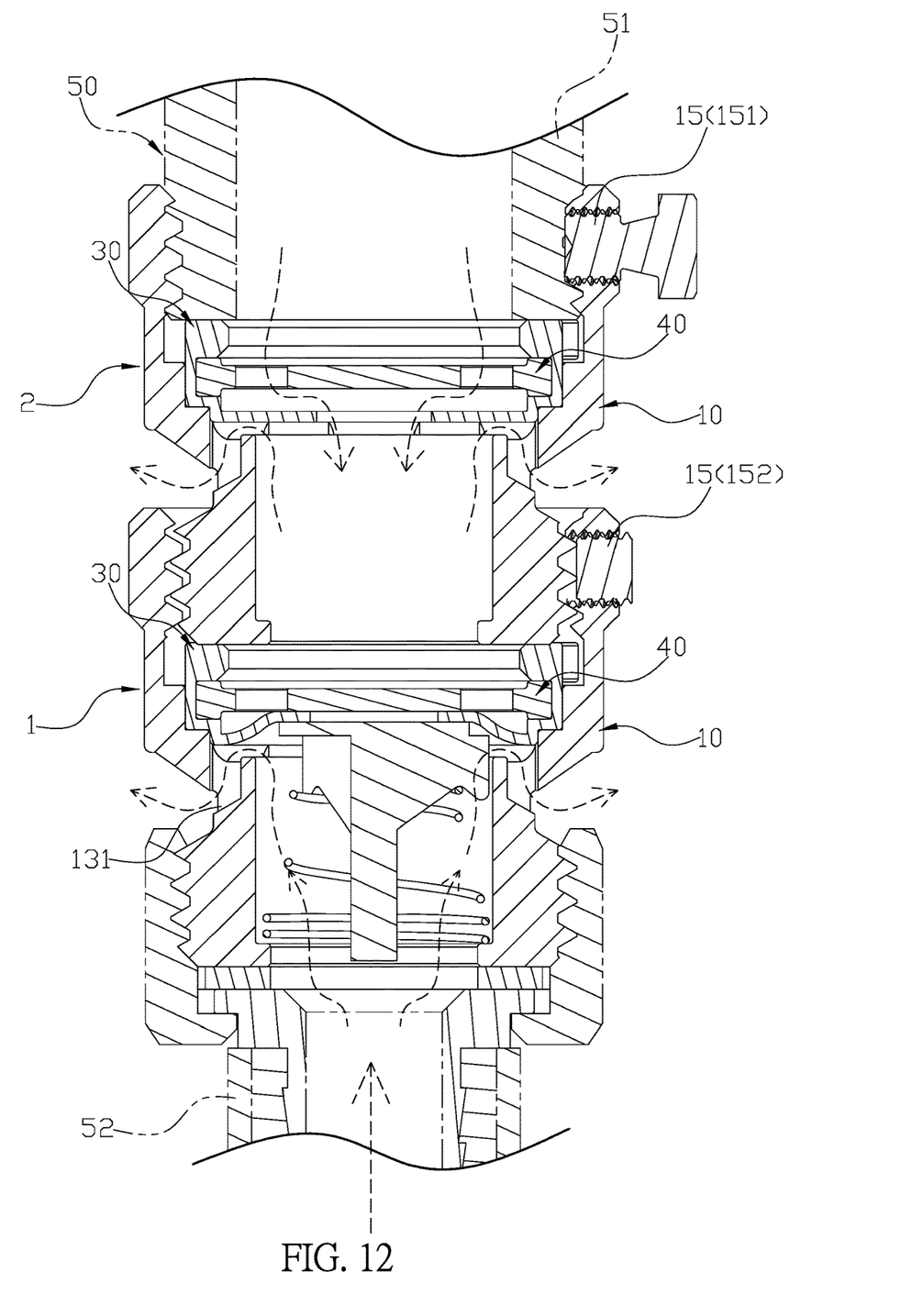
FIG. 12 is a schematic view of the second embodiment of the vacuum breaker valve of the present invention in the status of non-return and break vacuum.

In still a preferred embodiment, the pipe (50) has a water source (51) (such as faucet) and a water equipment (52), and the vacuum breaker valve (1) is connected to a cold-zone valve (2) to be an exhaust valve. The cold-zone valve (2) comprises a valve body (10), a waterstop (30), an abutting member (40) which are the same as the vacuum breaker valve (1) (the combination between the components is also exactly the same, but does not have the non-return member, as shown in FIG. 10). In case that the vacuum breaker valve (1) and the cold-zone valve (2) is connected vertically and then connected on the pipe (50) (as shown in FIG. 11) and the water source (51) is closed, the cold-zone valve (2) is adapted to drain the water out of the pipe (50) when the vacuum break valve (1) is back stopped (as shown in FIG.12), so that the cold-zone valve (2) is configured to completely drain the water remaining in the pipe (50) out, so as to prevent the water from accumulating and freezing in the pipe (50), thereby enabling the vacuum breaker valve (1) to be used in cold zone.

Figure 1:
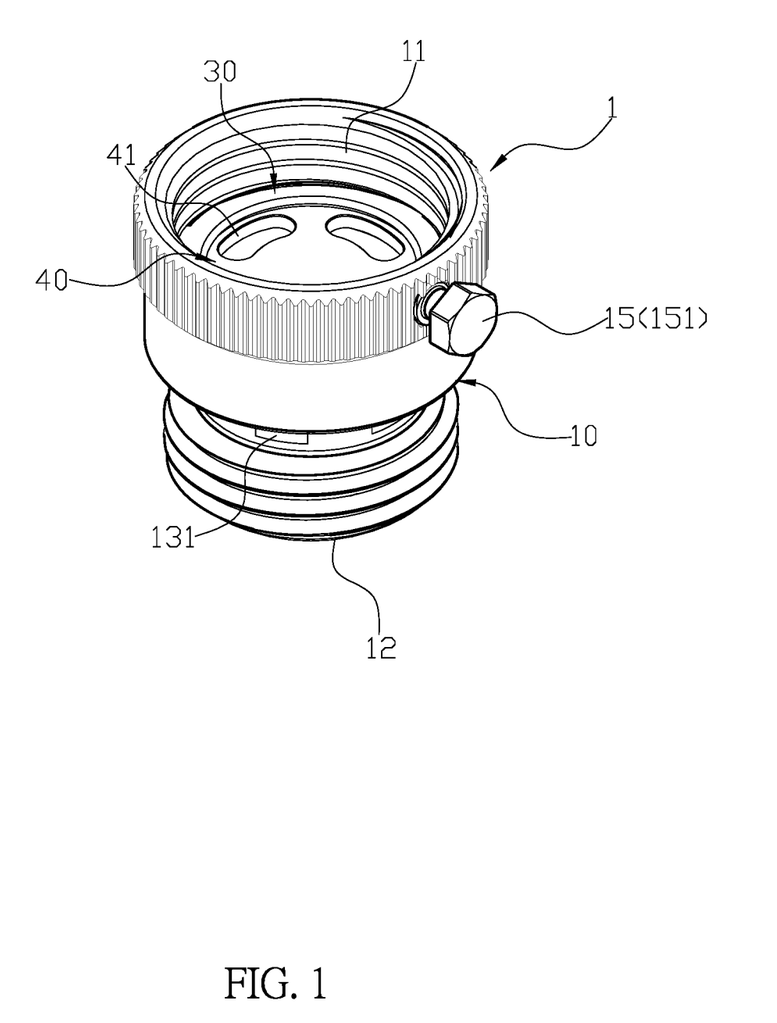
FIG. 1 is a three-dimensional assembly view of a vacuum breaker valve of the present invention.
Figure 2:
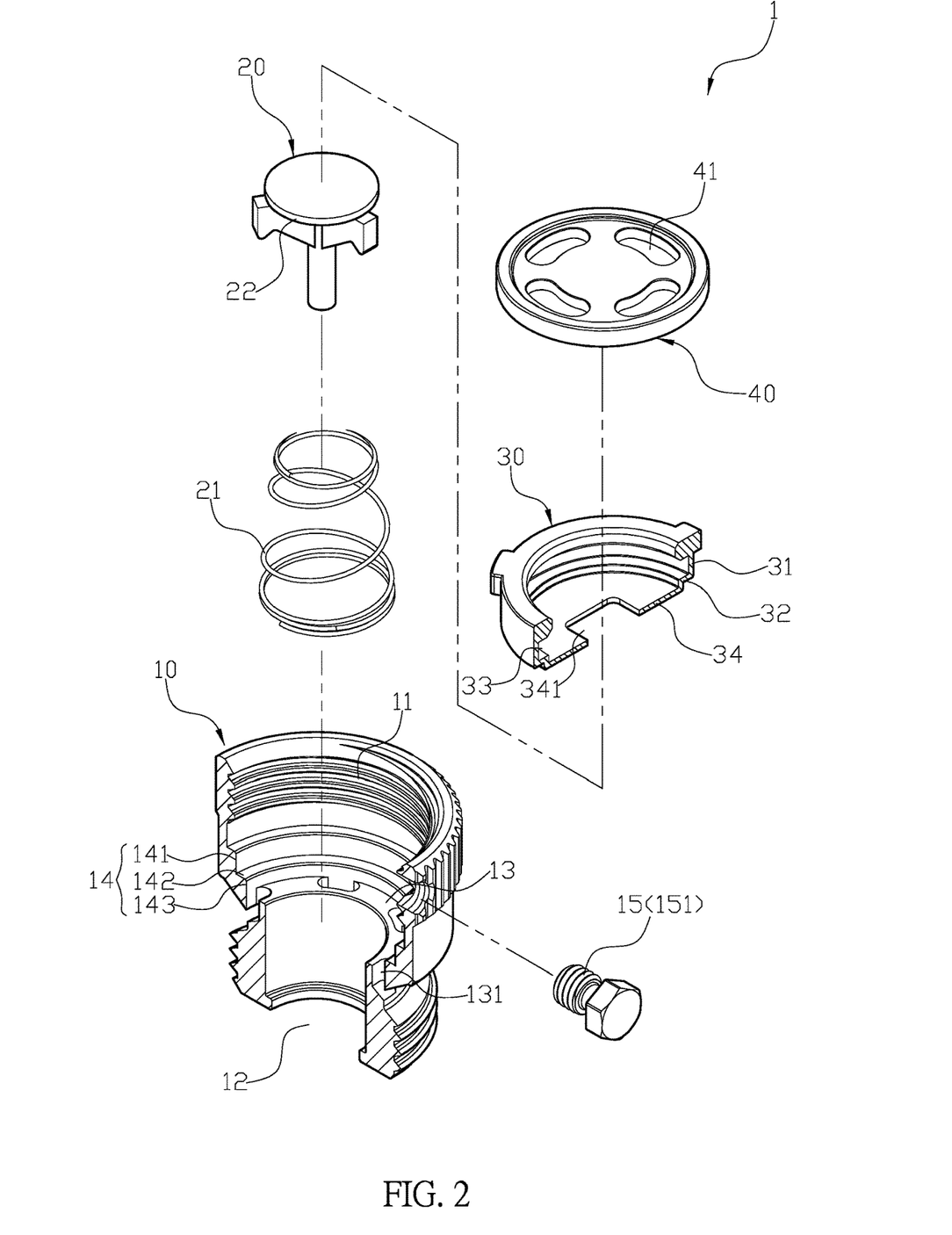
FIG. 2 is a three-dimensional exploded view of the vacuum breaker valve of the present invention.
Figure 3:
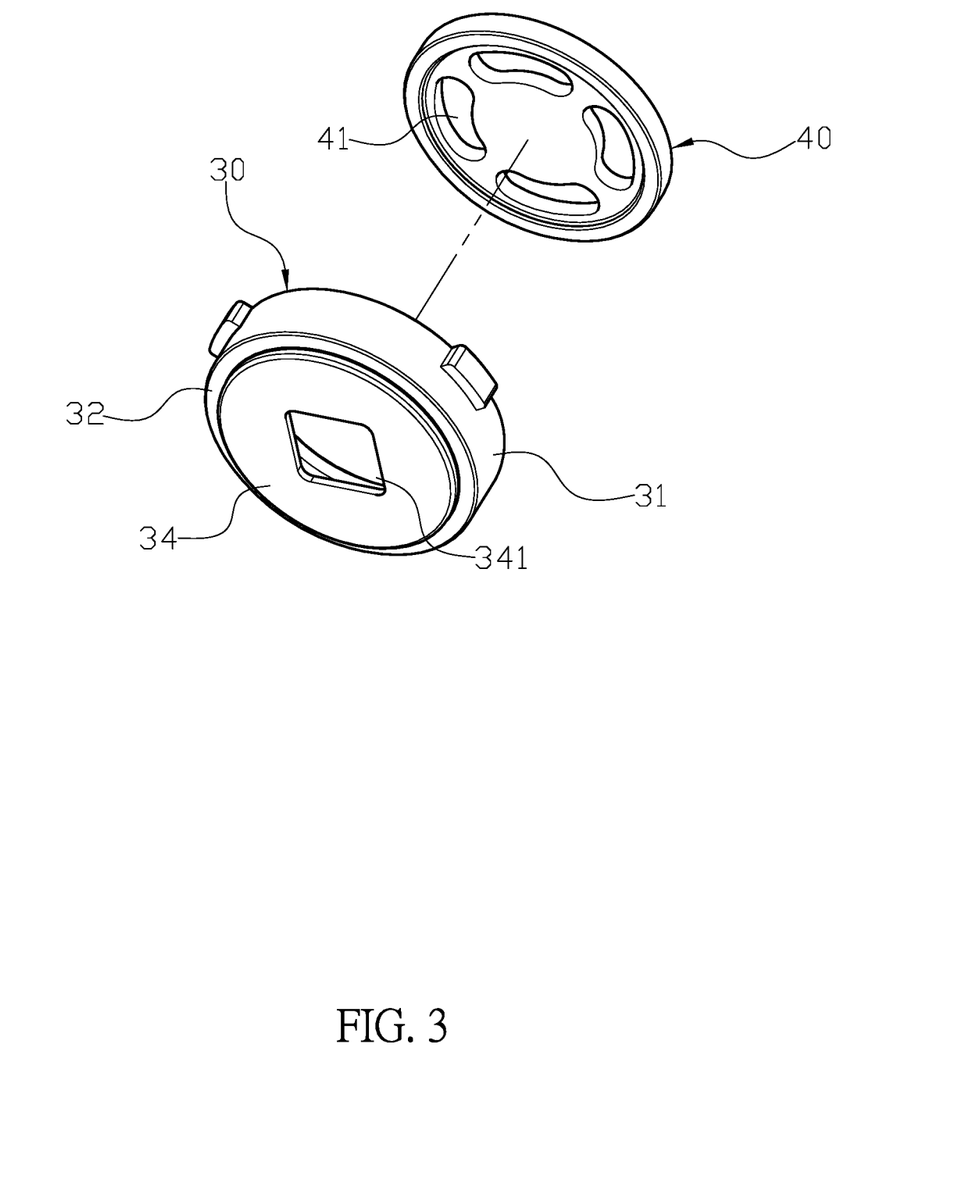
FIG. 3 is a three-dimensional from the other angle of a waterstop and an abutting member of the vacuum breaker valve of the present invention.
Figure 4:
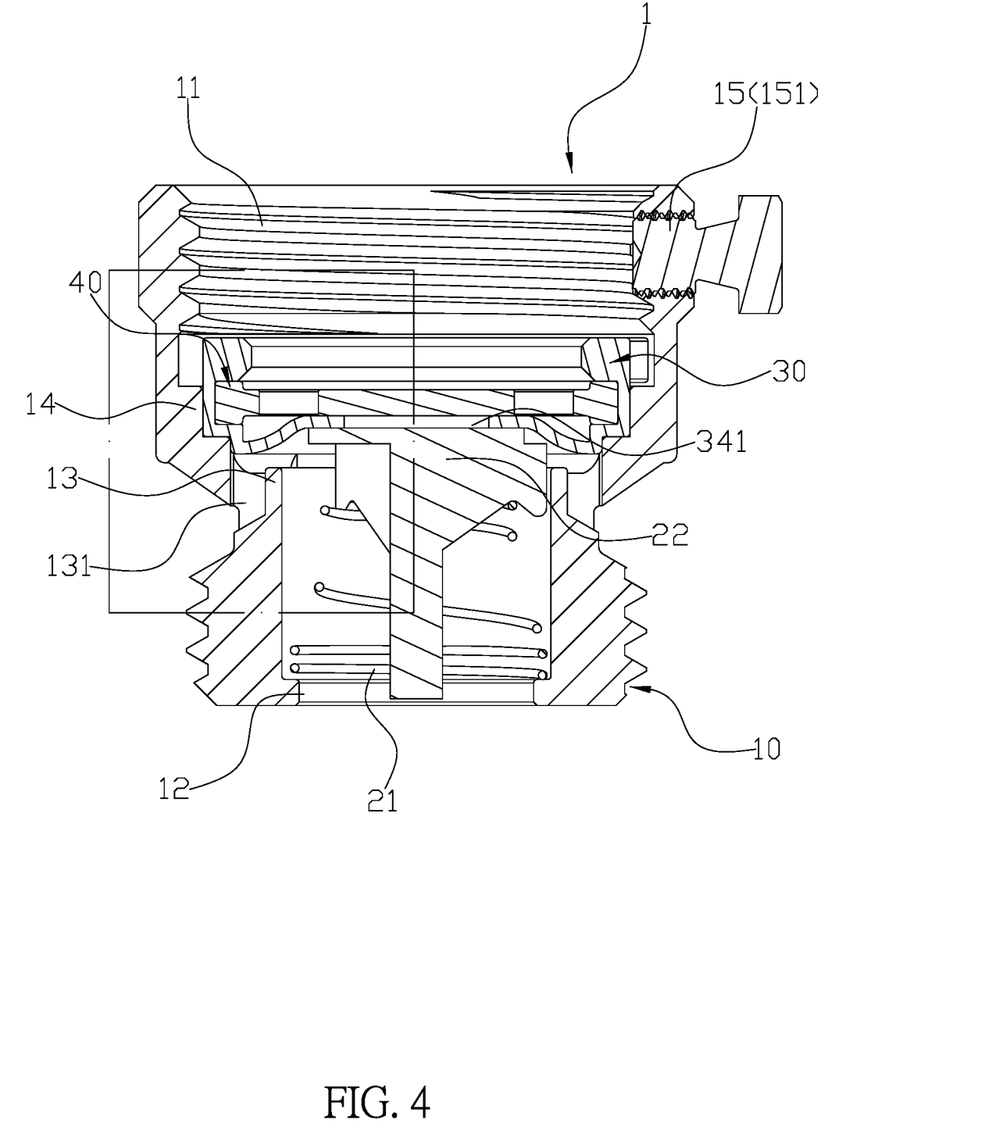
FIG. 4 is an assembly sectional view of the vacuum breaker valve of the present invention.
Figure 5:
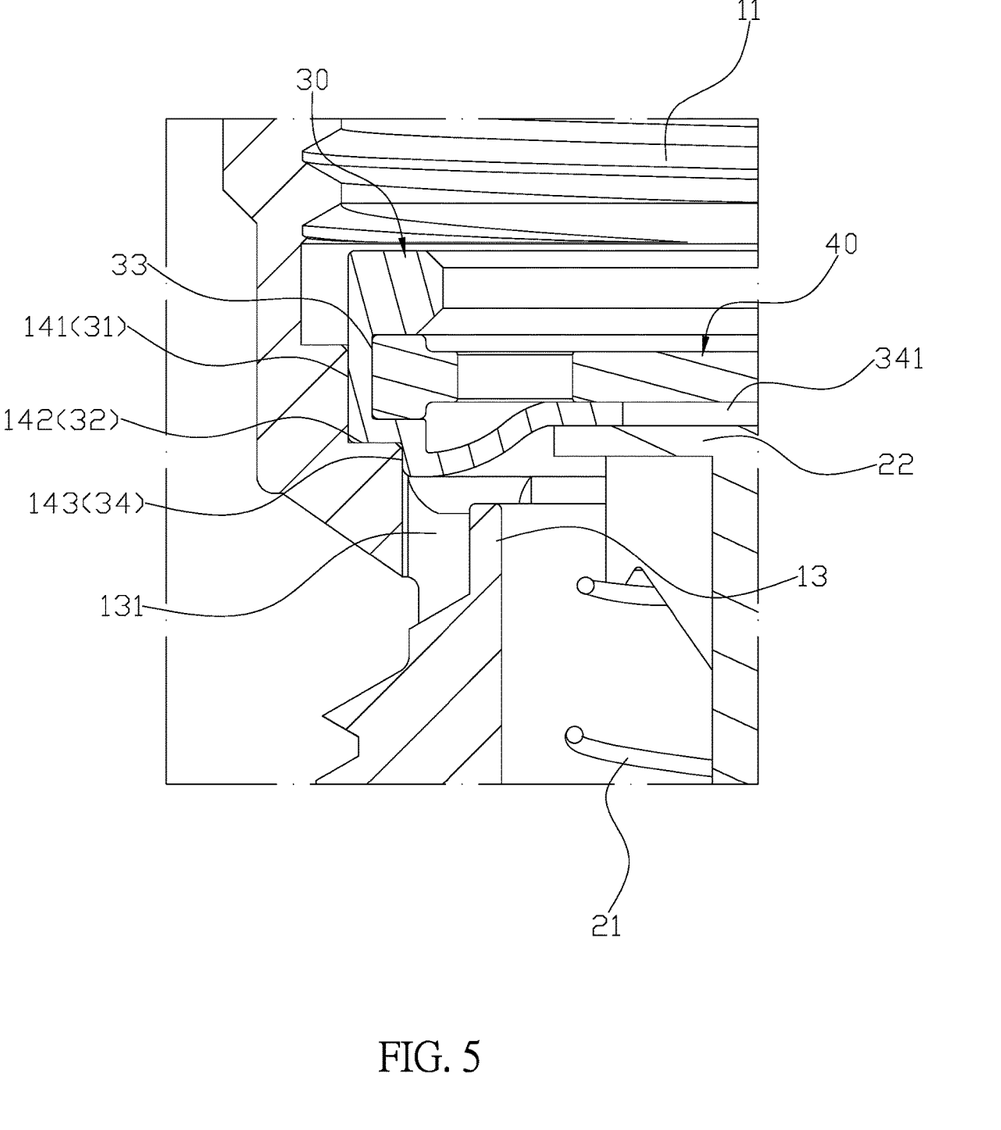
FIG. 5 is a sectional partial enlarged view of the vacuum breaker valve of the present invention.
Figure 6:
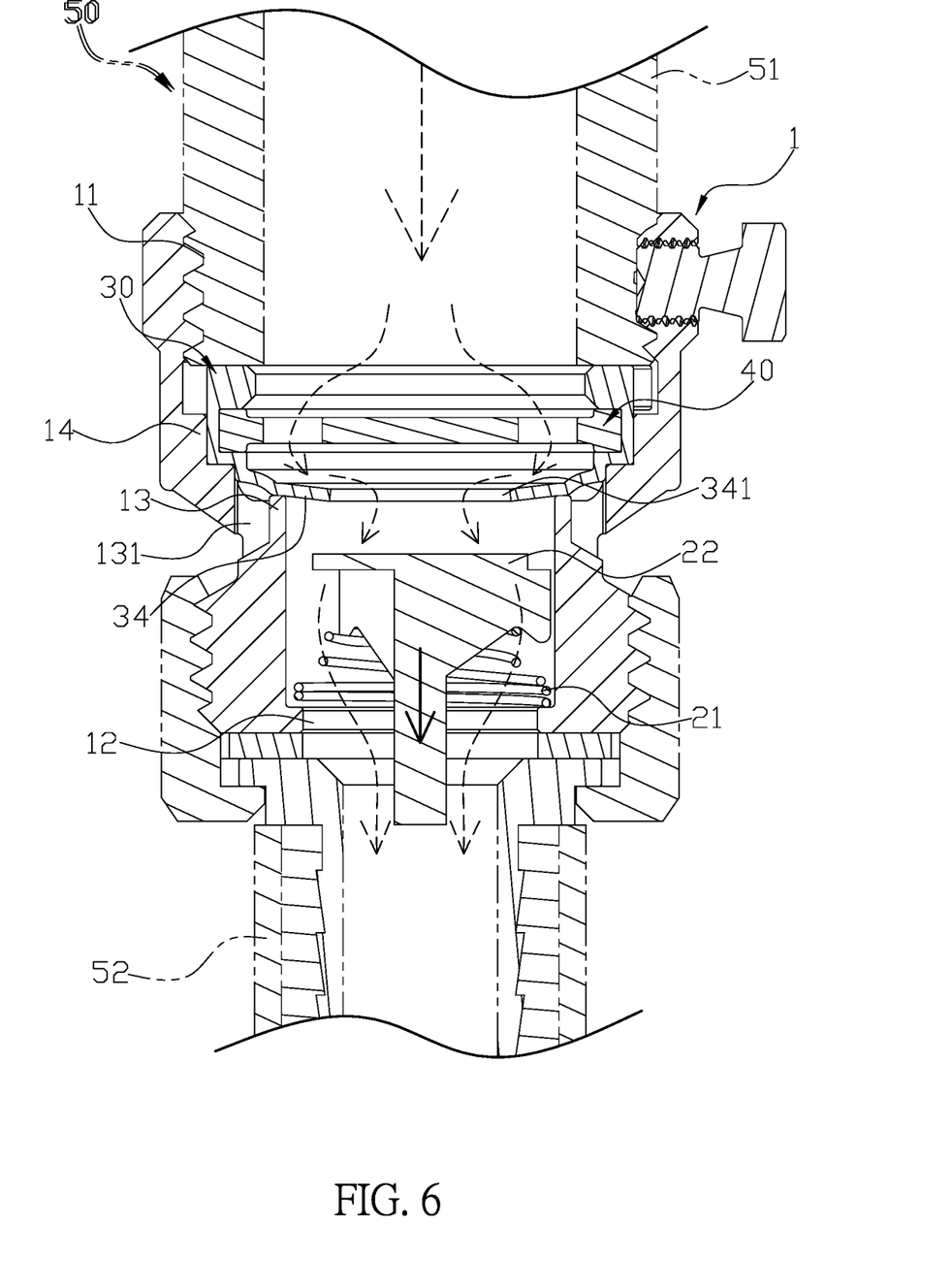
Figure 7:
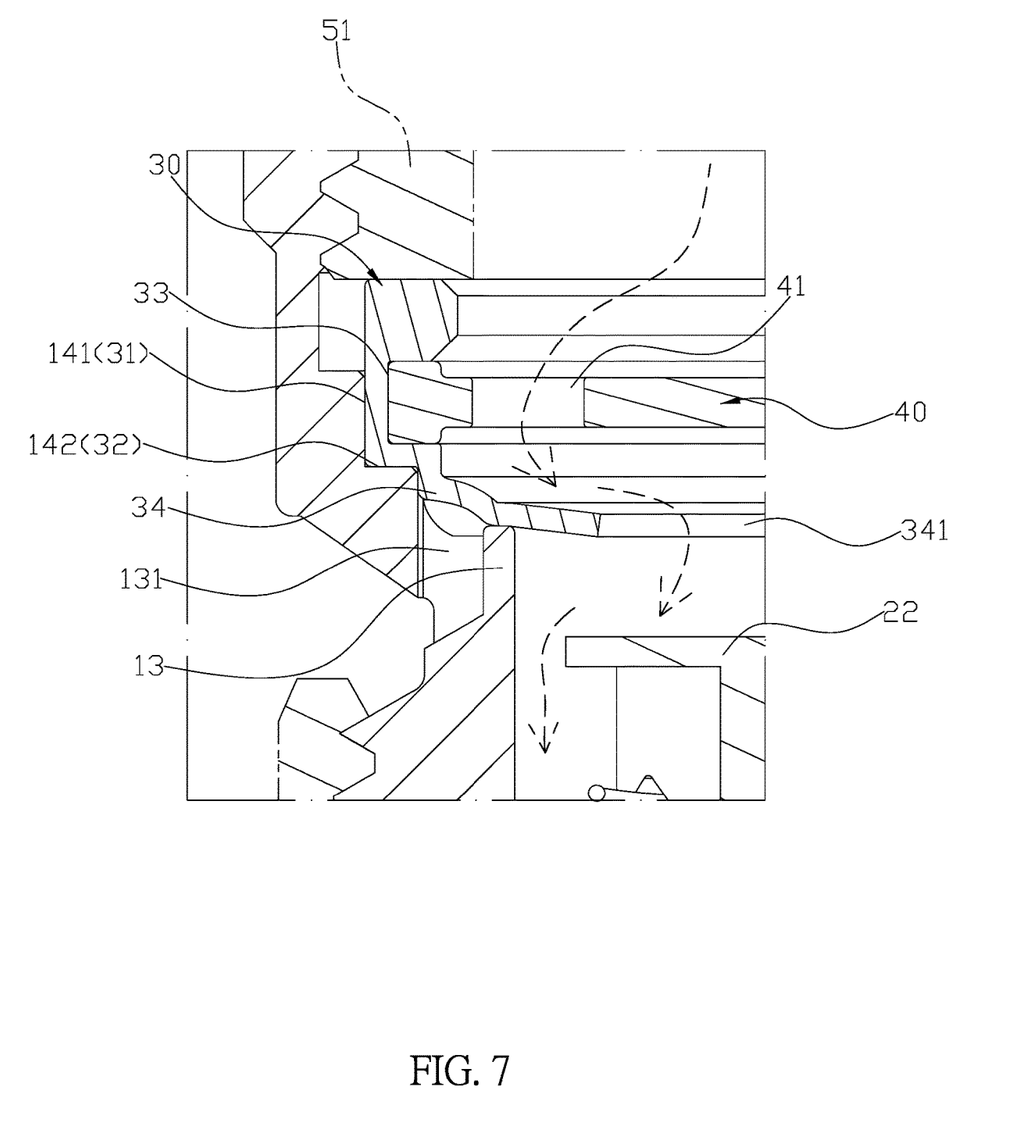
Figure 8:
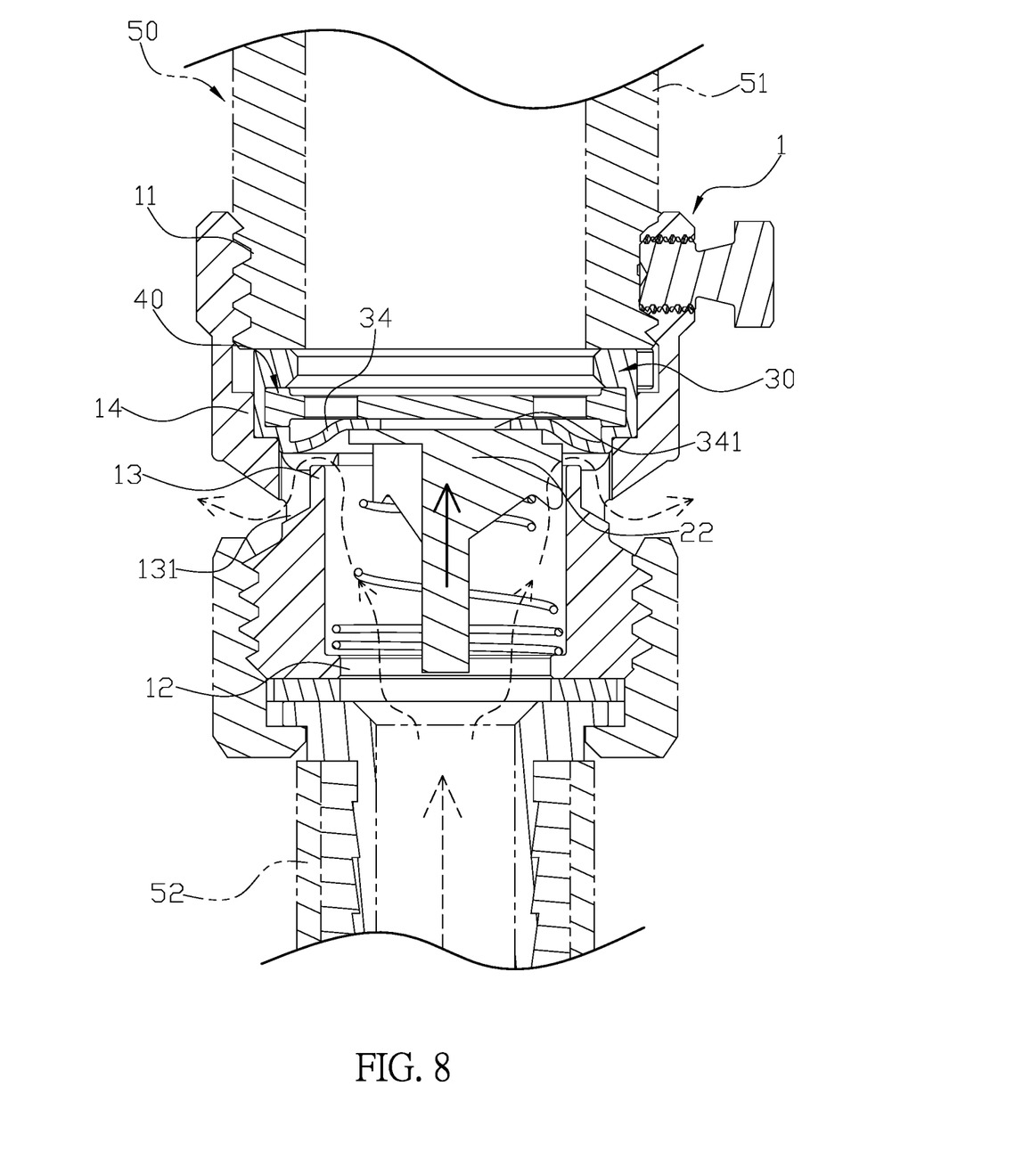
FIG. 8 is a schematic view the vacuum breaker valve of the present invention in the status of non-return and break vacuum.
Figure 9:
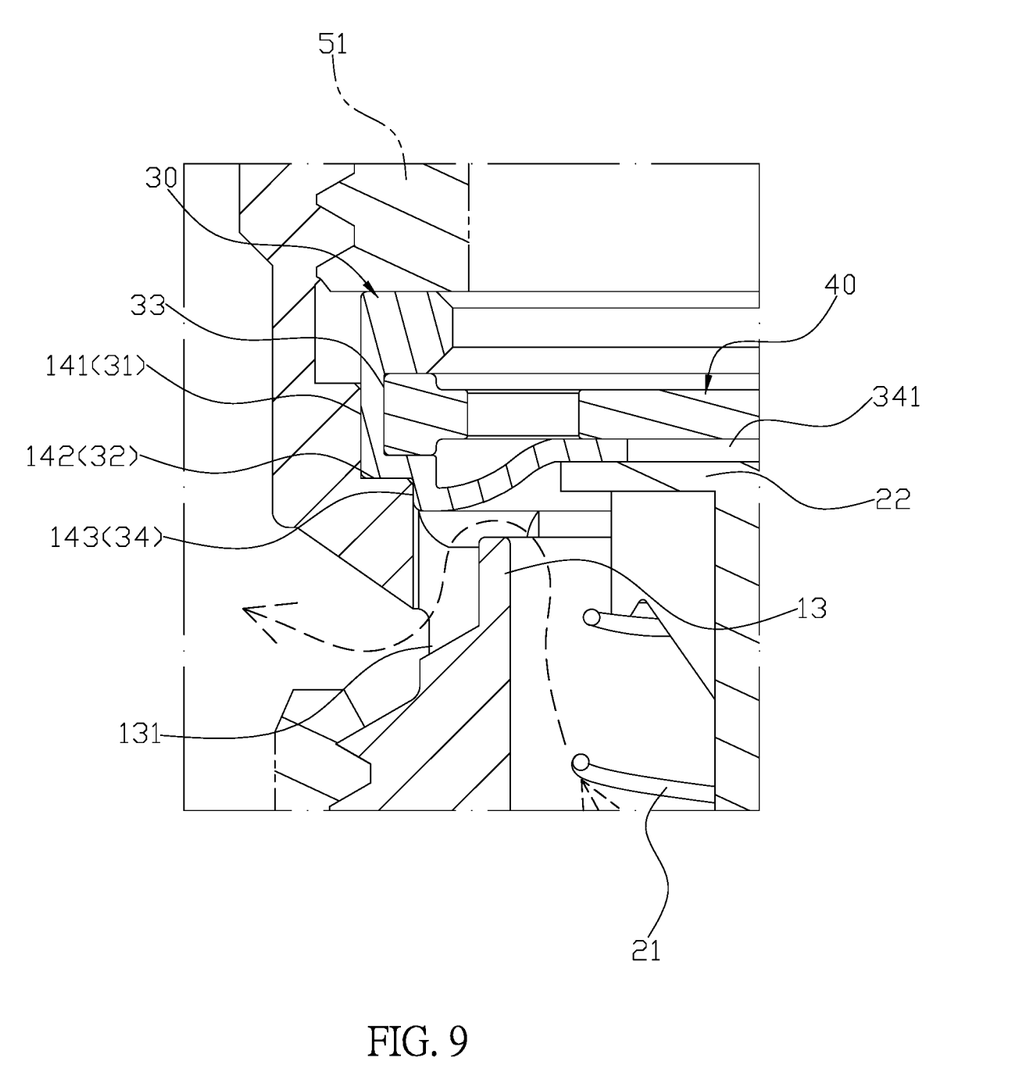
FIG. 9 is a partial enlarged view of FIG. 8.

In actual application, when the water source (51) is opened, the downward water flow is adapted to deform and push the elastic protrude (34) down, so that the elastic protrude (34) is further abutted against the shoulder portion (13), and the first through hole (131) is closed by the elastic protrude (34). Meanwhile, because of the water pressure, the downward water flow passing through the third through hole (41) and the second through hole (341) is configured to push the blocking member (22) away from the elastic protrude (34), so that the second through hole (341) is not blocked, and water flows into the water equipment (52) (as shown in FIGS. 6 and 7). On the other hand, when the water source (51) is closed, the blocking member (22) is adapted to be pushed back by the spring (21) to re-block the second through hole (341) and the elastic protrude (34) is configured to be back to its initial position so as to open the first through hole (131), and the first through hole (131) is adapted to communicate with external space so as to complete the pressure discharge and the effect of breaking vacuum (as shown in FIGS. 8 and 9).

Comparing with conventional vacuum breaker valve, the present invention is advantageous because: (i) the valve body (10) has the first abutting edge (141), the second abutting edge (142), and the third abutting edge (143) which respectively abut against and provide support for the peripheral edge (31), the bottom edge (32), and elastic protrude (34), so as to increase the contact area between the waterstop (30) and the valve body (10), thereby achieving improved leakage-proof of the waterstop (30); and (ii) the abutting member (40) is a hard round plate, and when the abutting member (40) is coupled in the locating groove (33) of waterstop (30), the peripheral edge (31), the bottom edge (32), and the elastic protrude (34) are respectively abutted against the first abutting edge (141), the second abutting edge (142), and the third abutting edge (143), so as to prevent leakage.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A vacuum breaker valve comprising a valve body, a non-return member, a waterstop, and an abutting member;
    wherein the valve body has a water inlet end and a water outlet end, and the valve body is connected to a pipe so as the water flows from the water inlet end to the water outlet end; the valve body has a shoulder portion and a stepped portion on the inner wall thereof, and the top surface of the shoulder portion comprises at least a first through hole downwardly penetrating the outer wall of the valve body; the shoulder portion is located below the stepped portion, and the stepped portion is formed in two steps shape, which has a vertical first abutting edge, a horizontal second abutting edge, and a vertical third abutting edge in sequence;
    wherein the non-return member comprises a spring and a blocking member which are positioned in the valve body, and the spring is abutted between the valve body and the blocking member;
    wherein the waterstop is formed in a round cap shape having an opening faced up, and the waterstop has a peripheral edge and a bottom edge which are connected together; a locating groove is formed on the inner wall of the peripheral edge, and an elastic protrude is configured to downwardly protrude from a center portion of the bottom edge, and at least a second through hole penetrates through the elastic protrude; when the waterstop is positioned into the valve body, the first abutting edge, the second abutting edge, and the third abutting edge respectively abut against and provide support for the peripheral edge, the bottom edge, and elastic protrude; the spring is adapted to push the blocking member to bear against the elastic protrude, so that the blocking member blocks the second through hole under normal condition when water is not used; and
    wherein the abutting member is a hard round plate, and at least a third through hole thereon, and the abutting member is coupled in the locating groove of the waterstop; with the outward push of the abutting member, the waterstop is configured to effectively fit with the first abutting edge, the second abutting edge, and the third abutting edge, and the waterstop is clamped by the abutting member, such that the first abutting edge, the second abutting edge, and the third abutting edge are adapted to respectively provide supports for the peripheral edge, the bottom edge, and the elastic protrude, so as to increase the contact area between the waterstop and the valve body, thereby achieving the leakage-proof of the waterstop.

2. The vacuum breaker valve of claim 1, wherein the valve body comprises a screw hole to receive a screw so as to secure the valve body on the pipe.

3. The vacuum breaker valve of claim 2, wherein the screw is a lock screw.

4. The vacuum breaker valve of claim 2, wherein the screw is a twist-off screw.

5. The vacuum breaker valve of claim 1, wherein the water inlet end and the water outlet end respectively have screw sections thereon to connect with the pipe.

6. The vacuum breaker valve of claim 1, wherein the thickness of the bottom edge and the thickness of the elastic protrude are respectively thinner than the thickness of the peripheral edge.

7. The vacuum breaker valve of claim 1, wherein the pipe has a water source and a water equipment, and the vacuum breaker valve is directly connected between the water source and the water equipment.

8. The vacuum breaker valve of claim 1, wherein the pipe has a water source and a water equipment, and the vacuum breaker valve is connected to a cold-zone valve to be an exhaust valve, and the cold-zone valve comprises the valve body, the waterstop, the abutting member which are the same as the vacuum breaker valve.

* * * * *